United States Patent
Bonaventura et al.

(10) Patent No.: US 11,349,731 B2
(45) Date of Patent: May 31, 2022

(54) DATA COLLECTION FOR THE EVALUATION OF THE QUALITY OF EXPERIENCE OF A SERVICE OVER A COMMUNICATIONS NETWORK

(71) Applicant: Telecom Italia S.p.A., Milan (IT)

(72) Inventors: Silvia Bonaventura, Turin (IT); Indro Moreno Francalanci, Turin (IT); Alessandro Verdolini, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 16/957,887

(22) PCT Filed: Dec. 27, 2018

(86) PCT No.: PCT/EP2018/097017
§ 371 (c)(1),
(2) Date: Jun. 25, 2020

(87) PCT Pub. No.: WO2019/129803
PCT Pub. Date: Jul. 4, 2019

(65) Prior Publication Data
US 2021/0058303 A1 Feb. 25, 2021

(30) Foreign Application Priority Data
Dec. 28, 2017 (IT) .................. 102017000150113

(51) Int. Cl.
*H04L 41/5067* (2022.01)
*H04L 41/5009* (2022.01)
(Continued)

(52) U.S. Cl.
CPC ...... *H04L 41/5067* (2013.01); *H04L 41/5009* (2013.01); *H04L 43/065* (2013.01);
(Continued)

(58) Field of Classification Search
CPC ............ H04L 41/5009; H04L 41/5067; H04L 43/065; H04L 43/0888; H04L 43/14;
(Continued)

(56) References Cited

U.S. PATENT DOCUMENTS

| 2009/0228340 A1* | 9/2009 | Bohannon | G06Q 30/0217 |
| | | | 705/14.53 |
| 2010/0161506 A1* | 6/2010 | Bosenick | G06Q 30/02 |
| | | | 705/347 |

(Continued)

FOREIGN PATENT DOCUMENTS

| EP | 2571195 A1 | 3/2013 |
| WO | 2014/040646 A1 | 3/2014 |

OTHER PUBLICATIONS

Recommendation ITU-T P.10/G.100, Amendment 5, Jul. 2016, p. 1.
(Continued)

*Primary Examiner* — Le H Luu
(74) *Attorney, Agent, or Firm* — Banner & Witcoff, Ltd.

(57) ABSTRACT

A method is disclosed for collecting data for evaluating the quality of experience of a service provided to a user over a communications network. The method comprises: providing an agent on a user device; by the agent, collecting rough measurement data indicative of parameters related to an operation of the device during an instance of service fruition, providing derived measurement data from the rough data and sending them to a server; at the server, determining an ending of the instance and checking, based on the derived data, forwarding conditions indicating at least one condition to be satisfied in order for the server to send a questionnaire to the user device, comprising questions related to the instance of service fruition; after the ending of the instance, (Continued)

in case the conditions are satisfied, sending the questionnaire from the server to the device; and collecting by the agent a user feedback.

12 Claims, 2 Drawing Sheets

(51) Int. Cl.
  *H04L 43/065* (2022.01)
  *H04L 43/00* (2022.01)
  *H04L 43/50* (2022.01)
  *H04L 43/0888* (2022.01)
(52) U.S. Cl.
  CPC .......... *H04L 43/0888* (2013.01); *H04L 43/14* (2013.01); *H04L 43/50* (2013.01)
(58) Field of Classification Search
  CPC ..... H04L 43/50; H04L 67/22; G06F 16/2428; G06F 16/24575; G06F 21/6245; G06F 3/0428; G06Q 10/06316; G06Q 10/0637; G06Q 10/10; G06Q 30/0201; G06Q 30/0217; G06Q 30/02
  See application file for complete search history.

(56) References Cited

U.S. PATENT DOCUMENTS

| | | | | |
|---|---|---|---|---|
| 2012/0330722 | A1* | 12/2012 | Volpe | G06Q 30/0201 705/7.32 |
| 2013/0097664 | A1* | 4/2013 | Herz | G06Q 10/10 726/1 |
| 2014/0222522 | A1* | 8/2014 | Chait | G06Q 10/0637 705/7.36 |
| 2015/0244820 | A1* | 8/2015 | Verkasalo | H04L 67/22 707/740 |
| 2016/0103897 | A1* | 4/2016 | Nysewander | G06F 16/2428 707/602 |
| 2016/0103921 | A1* | 4/2016 | Brust | G06F 16/24575 707/722 |
| 2017/0124278 | A1* | 5/2017 | Gutekunst | G06F 21/6245 |
| 2017/0201850 | A1* | 7/2017 | Raleigh | G06F 3/0482 |
| 2017/0228681 | A1* | 8/2017 | Sci | G06Q 10/06316 |
| 2018/0174224 | A1* | 6/2018 | Wilkinson | G06Q 30/0631 |

OTHER PUBLICATIONS

Qualinet White Paper on Definitions of Quality of Experience (2013), Output from the fifth Qualinet meeting, Novi Sad, Mar. 12, p. 6.
Recommendation ITU-T E.800, Sep. 2008, p. 3.
"A smartphone agent for QoE evaluation and user classification on mobile networks", A. Verdolini, S. Petrangeli, Fifth International Workshop on Quality of Multimedia Experience (QoMEX), 2013.
Feb. 11, 2019—(WO) ISR and Written Opinion—App PCT/EP2018/097017.
István Ketykó et al., "Performing QoE-measurements in an actual 3G network", Broadband Multimedia Systems and Broadcasting (BMSB), 2010 IEEE International Symposium on, IEEE, Piscataway, NJ, USA, Mar. 24, 2010 (Mar. 24, 2010), pp. 1-6.

* cited by examiner

DATA COLLECTION FOR THE EVALUATION OF THE QUALITY OF EXPERIENCE OF A SERVICE OVER A COMMUNICATIONS NETWORK

TECHNICAL FIELD

The present invention relates to the field of telecommunications. In particular, the present invention relates to a method for collecting data for evaluating the quality of experience of a service over a communications network.

BACKGROUND ART

The continuous growth of mobile users and bandwidth-consuming applications and services recently put a serious challenge on how to efficiently exploit existing networks resources and improve the users' experience. Within this framework, the relevance of the Quality of Experience (QoE) has been assessed by both industrial and academic players in the telecommunication field. As known, a current working definition of QoE identifies it as "the degree of delight or annoyance of the user of an application or service" and "results from the fulfilment of his or her expectations with respect to the utility and/or enjoyment of the application or service in the light of the user's personality and current state" (Recommendation ITU-T P.10/G.100, Amendment 5, July 2016, page 1, and Qualinet White Paper on Definitions of Quality of Experience (2013), *Output from the fifth Qualinet meeting, Novi Sad*, March 12, page 6).

The QoE of a telecommunications service is highly dependent on the Quality of Service (QoS), which relates to the "totality of characteristics of a telecommunications service that bear on its ability to satisfy stated and implied needs of the user of the service" (Recommendation ITU-T E.800, September 2008, page 3). Typically, QoS deals with technical network parameters and with measurable performance factors, while QoE implies taking into account human influence factors reflecting how the user perceives a service provided by a service provider. As a matter of fact, the way a customer perceives a service can be affected by objective aspects that may be described in terms of network parameters and performance measurements, but also by subjective aspects comprising her/his expectations, past experience, needs, and so on. In practice, two customers of a same service may have different perceptions of the service, even if the network performance (in terms of, for instance, available bandwidth and/or signal strength) is the same.

Document "A smartphone agent for QoE evaluation and user classification on mobile networks", A. Verdolini, S. Petrangeli, Fifth International Workshop on Quality of Multimedia Experience (QoMEX), 2013, discloses TeleAbarth, an Android application able to collect network measurements and end-users quality feedback regarding the use of smartphone applications. The paper further discloses a field experimentation to study the relationship between QoS and QoE for video streaming applications, in terms of downstream bandwidth and video loading time, and to develop a technique to classify user behaviour through his or her reliability, sensibility and fairness.

SUMMARY OF THE INVENTION

According to the approach described in the prior art cited above, the users of the field experimentation are asked to watch at least two or more video streaming every day and answer to instant polls sent to them some minutes after the fruition of the video streaming service. In other words, an instant poll is unconditionally forwarded to the user some minutes after the fruition of a video. The user's answers are collected by the agent and sent to a server for processing and evaluating the QoE of the service.

The inventors has noticed that this approach may lead to an unnecessarily huge amount of data to be exchanged between the server and the user's smartphone, which implies a waste of network resources.

Indeed, the approach described above may cause a user to give obvious answers to questions put forward in an instant poll, since the user may get bored about receiving a questionnaire each time she/he watches a video on her/his smartphone. Hence, the answers may not be useful from a statistical point of view. Moreover, the user is faced with an instant poll even in case the network performance is objectively good. This means that the user's answers may not be useful as they do not address any network problem. In these cases, forwarding the instant polls and collecting the users' answers may cause an unnecessary waste of network resources.

Starting from the approach described in the document cited herein above, the Applicant has tackled the problem of providing a method for collecting data for evaluating the quality of experience of a service over a communications network which allows overcoming the drawbacks outlined above. In particular, the Applicant has tackled the problem of providing a method for collecting data for evaluating the quality of experience of a service over a communications network which allows reducing the amount of data exchanged over the communications network and optimizing the network resource usage.

According to a first aspect, the present invention provides a method for collecting data for evaluating the quality of experience of a service provided to a user over a communications network, the method comprising:

a) providing an agent configured to run on a user device of the user, the user device being capable of connecting to the communications network;

b) collecting by the agent rough measurement data indicative of parameters related to an operation of the user device during an instance of fruition of the service by the user;

c) providing by the agent derived measurement data derived from the rough measurement data and sending the derived measurement to a server through the communications network;

d) at the server, determining an ending of the instance of fruition of the service and checking, based on the derived measurement data, one or more forwarding conditions indicating at least one condition to be satisfied in order for the server to send a questionnaire to the user device, the questionnaire comprising questions related to the instance of service fruition;

e) after the ending of the instance of service fruition, in case the one or more forwarding conditions are satisfied, sending the questionnaire from the server to the user device; and f) collecting by the agent a feedback from the user.

Preferably, the rough measurement data are collected during pre-determined measurement time windows.

Preferably, the measurement time windows are of variable duration according to a location of the user device.

Preferably, the method further comprises determining a number of frequent locations indicating the most frequented positions of the user device and associating with the frequent locations measurement time windows having a longer duration than measurement time windows associated with other locations of the user device.

According to embodiments of the present invention, the rough measurement data comprise a first subset of data indicative of static parameters identifying the user device comprising on or more of: device hardware model; device firmware model; screen resolution; operating system release; agent release.

Preferably, the rough measurement data comprise a second subset of data indicative of one or more of the following parameters associated with an operation of the user device: a received signal strength indicator; a reference signal received power; a reference signal received quality; a date and time of the day; geographic coordinates; a local area code; a cell ID; a mobile network operator; a radio access technology; an access point name; an IP address.

Preferably, the rough measurement data comprise samples of a third subset of data indicative of one or more of the following parameters associated with a software application installed on the user device: throughput, in downstream and upstream and in foreground and background; volume, in downstream and upstream and in foreground and background.

According to embodiments of the present invention, step c) is preferably performed at the end of a measurement time window and the derived measurement data comprise one or more of an average value, a minimum value, a maximum value and a standard deviation of the samples collected during the measurement time window.

Preferably, at step d) determining an ending of the instance of fruition of the service comprises detecting a corresponding event, detecting comprising comparing one or more derived measurement data collected by the server during the measurement time windows spanning the duration of the instance of service fruition with corresponding thresholds.

Preferably, the forwarding conditions are checked based on the derived measurement data collected by the server at the end of the measurement time window comprising the event.

Preferably, the forwarding conditions relate to one or more of the following parameters: a strength of a signal received by the user device within the communications network; a radio access technology available to the user device; a number of cell reselections experienced by the user device within the communications network; a location of the user device; a speed of movement of the user device; a time of the day.

Preferably, the forwarding conditions comprise one or more of the following conditions:
  the signal strength is lower than a first threshold;
  the user device is not using a Wi-Fi connection;
  the user device experiences a number of cell reselections higher than a second threshold;
  an average throughput of a certain software application is lower than a third threshold;
  a call has been just terminated at the user device;
  it is a given time of the day;
  the user has been in a certain location.

Preferably, the forwarding conditions comprise conditions related to a user behaviour.

According to embodiments of the present invention, the forwarding conditions comprise conditions according to which the questionnaire is sent to the user device based on a random variable.

According to a second aspect, the present invention provides a communication system comprising a wireless communication network, a user device of a user of the communications network and a server, wherein a service provider provides a service to the user through the communications network, and wherein the user device comprises an agent, the user device being capable of connecting to the communications network, wherein the agent is configured to:
  collect rough measurement data indicative of parameters related to an operation of the user device during an instance of fruition of the service by the user; and
  provide derived measurement data derived from the rough measurement data and send the derived measurement to the server through the communications network,
wherein the server is configured to:
  determine an ending of the instance of fruition of the service and check, based on the derived measurement data, one or more forwarding conditions indicating at least one condition to be satisfied in order to send a questionnaire to the user device, the questionnaire comprising questions related to the instance of service fruition; and
  after the ending of the instance of service fruition, in case the one or more forwarding conditions are satisfied, send the questionnaire to the user device,
and wherein the agent is further configured to collect a feedback from the user.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
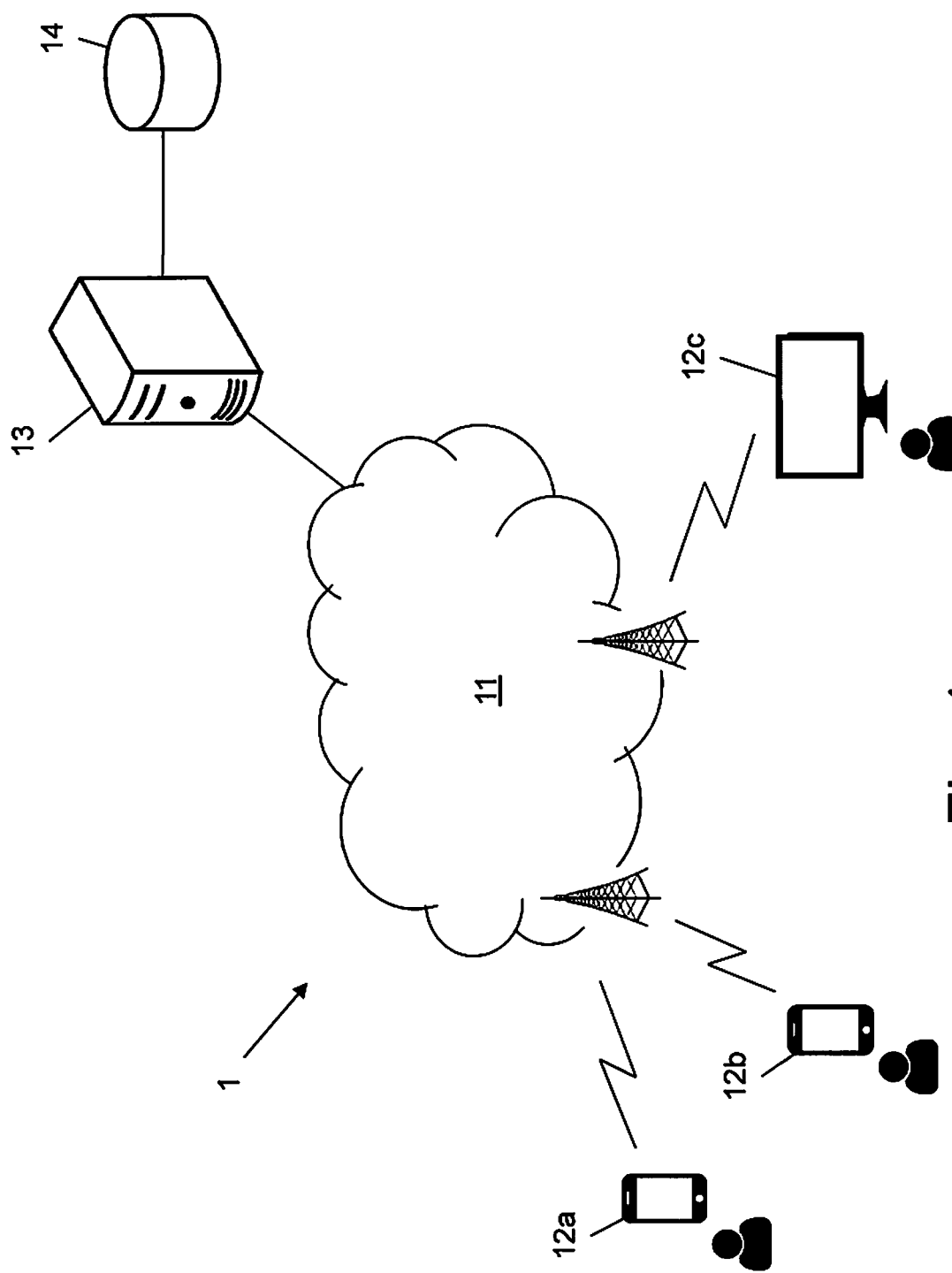
FIG. 1 schematically shows a communications system according to embodiments of the present invention.

FIG. 1 schematically shows a communications system 1 according to embodiments of the present invention. In the communications system 1, one or more service providers provide a number of services to users through one or more communications networks. Preferably, the one or more communications networks are wireless communications networks, and may comprise either mobile communications networks of possibly different mobile network operators, or fixed wireless communications networks (e.g. a Wi-Fi communications network). The communications network 11 may comprise one or more of the following: a 3G communications network, a long term evolution (LTE) communications network, a 5G communications network. These networks are represented with a single cloud 11 in FIG. 1. For simplicity, reference will be made to a "communication network 11". Users are equipped with respective user devices through which they are able to enjoy the services provided over the communications network 11.

Services may comprise voice calls, VoIP calls, video calls, instant messaging, social networking, web mapping, video streaming, audio streaming, IPTV and the like. User devices may include smartphones, tablets, notebooks, personal computers, smart TVs, portable media players and the like. In FIG. 1, three user devices 12a, 12b, 12c are schematically shown for sake of example. They may be, for instance a first smartphone 12a, a second smartphone or a tablet 12b, and a smart TV 12c.

Each user device 12a, 12b, 12c, according to the present invention, is adapted to perform a number of measurements providing rough measurement data indicative of a set of parameters identifying the user device (e.g., device hardware model) or related to its operation (e.g. throughput), as it will be described herein after. Moreover, each user device 12a, 12b, 12c preferably comprises an agent adapted to operate the user device to perform the number of measurements cited above. The agent is also preferably adapted to collect said rough measurement data and/or process said rough measurement data to provide derived measurement data to be sent to server 13. The agent is preferably a software application installed on the user device and it preferably integrates a graphical user interface (GUI). The GUI may allow the user to activate/deactivate the agent or to configure the agent settings, so as to, for instance, set the agent to start automatically when the user device is switched on. The GUI is also configured to display push notifications and questionnaires provided to the user and to gather the user's answers according to embodiments of the present invention, as it will be described herein after.

The communications system 1 further comprises a server 13 connected to the user devices 12a, 12b, 12c through the communications network 11. The server 13 is configured to receive from the user devices the derived measurement data provided by the agents installed thereon and process them to evaluate the quality of experience (QoE) of one or more monitored services. The techniques and algorithms used by the server 13 to process the collected data and evaluate the QoE are not relevant to the present invention and hence will not be described in detail herein after.

Moreover, the communications system 1 comprises a database 14 connected to the server 13 and configured to store the derived measurement data received by the server 13 from the user devices 12a, 12b, 12c.

As mentioned above, according to the present invention, the agent residing in a user device is preferably configured to operate the user device to perform a number of measurements. The number of measurements are preferably performed by the user device when the user device is connected to a wireless communications network (either a mobile communication network or a Wi-Fi domestic communications network, or the like). Measurements are performed during normal operation of the user device and are related to real traffic received/generated by the user device. Real traffic indicates the amount of data received/generated by the user device interacting with the communications network for providing the user with the required services. Performing measurements related to real traffic is advantageous as it allows avoiding generating ad-hoc artificial traffic for measurement purposes and hence it allows avoiding consuming the user's traffic bundle. Moreover, it allows measuring parameters descriptive of the real normal operation of the user device within the communications network.

When the agent is running on the user device, measurements may be performed at one or more pre-configured instants of time after the user device switch on (for instance, each time the user device is restarted), or during pre-determined measurement time windows starting at pre-configured points of time and having a pre-configured duration. The instants of time at which measurements are performed by the agent may be configured in the agent by a service or platform administrator. In particular, the administrator may establish a starting time for a measurement session during which measurements are performed by the user device, the measurement session comprising one or more sequentially adjacent measurement time windows. More in particular, the administrator may configure the starting time of the measurement session and the duration of each measurement time window of the measurement session. A measurement session may also be configured to start automatically when the agent starts running on the user device (e.g. after a user device switch on).

Measurements may be performed at the start (and/or at the end) of each measurement time window, or continuously during each measurement time window with a predetermined sampling period. In this latter case, the rough measurement data collected during the measurement time window comprise a number of measurement samples spaced one from the other by the sampling period (e.g. throughput samples). These samples are then preferably processed by the agent to provide derived measurement data comprising minimum, maximum and average values, as well as standard deviations, of the relevant parameter (e.g. throughput). Further, measurements may also be performed asynchronously with respect to the measurement time windows, as it will be described herein after.

Preferably, the measurement time windows have fixed or variable duration. In both cases, the duration of each measurement time window may be in the range from 1 to 60 minutes, e.g. 20 minutes. Preferably, each measurement time window comprises, at the end thereof, a time interval during which the rough measurement data collected during the measurement time window are processed in order to determine the derived measurement data to be sent to the server 13. During the same time interval the derived measurement data are preferably sent to the server 13. This time interval may have a duration of a few seconds.

Within each measurement time window, the sampling period may be equal to hundreds of milliseconds, e.g. 250 ms.

The set of measurements performed by the user device preferably provides a first sub-set of rough measurement data indicative of a set of static parameters identifying the user device (namely, parameters indicative of the hardware and/or software equipment of the user device) comprising:
device hardware model;
device firmware model;
screen resolution;
operating system release;
agent release.

The rough measurement data of the first subset are collected by the agent each time the user device starts operating, or in one pre-determined measurement time window during operation of the user device. The derived measurement data sent to the server 13 in this case correspond to the rough measurement data.

The set of measurements performed by the user device preferably provides a second sub-set of rough measurement data indicative of a set of parameters associated with the operation of the user device as related to its connectivity with the considered communications network. This sub-set of rough measurement data are preferably indicative of one or more of the following parameters:
received signal strength indicator (RSSI);
reference signal received power (RSRP);
reference signal received quality (RSRQ);
date and time of the day;
geographic coordinates (e.g. based on the WGS84 coordinate system);
local area code (LAC);

cell ID;
mobile network operator;
radio access technology (RAT);
access point name (APN);
IP address.

The rough measurement data of the second sub-set are preferably collected by the agent at the start and/or at the end of each measurement time window. The derived measurement data sent to the server 13 in this case correspond to the rough measurement values.

The set of measurements performed by the user device preferably provides a third sub-set of rough measurement data indicative of a set of parameters associated with the operation of the user device as related to the fruition of services. The operation of the user device involves establishing calls and/or data sessions through the communications network for the fruition of the services cited above. Typically, fruition of the services is performed through execution of software applications. Examples of software applications are Google Chrome® for Internet browsing, WhatsApp®, Skype® for instant messaging, YouTube® for video streaming, Google Play for music streaming, Facebook®, Twitter®, Instagram® for social networking, Google Maps® for web mapping. During each measurement time window, the agent preferably monitors one or more software applications residing on the user device through collection of relevant rough measurement data of this third sub-sets. It is to be noticed that, according to the present invention, the agent is capable of monitoring all the software applications residing on the user device, comprising the software applications that operate in the absence of connectivity to the communications network.

In particular, the third sub-set of rough measurements data preferably comprises data indicative of one or more of the following parameters:
  signal strength during the measurement time window;
  number of cell reselections for a given RAT during the measurement time window;
  overall upstream traffic and overall downstream traffic;
  throughput of each monitored application, in downstream and upstream and in foreground and background;
  volume (measured in KB) of each monitored application, in downstream and upstream and in foreground and background;
  activity time (measured in seconds) of each monitored application, in downstream and upstream and in foreground and background;
  number of downloaded web pages;
  volume (measured in KB) of the downloaded pages;
  downloading time of the downloaded pages (measured in seconds);
  time between one download of a web page and the next one;
  number of streaming video contents;
  downstream throughput of the video streaming service (measured in kbps);
  duration of the streaming video contents;
  loading time (i.e. time between the video streaming request and the actual start of the content download) of a streaming video content;
  number of established, failed and dropped data sessions;
  access time of data sessions (i.e. time to establish a new data session);
  number of calls;
  duration of the calls;
  data (identifier of the event, geographic coordinates of the event, date and time of the event, duration of the event) related to asynchronous events such as:
    dropping of a data session;
    hole in the radio coverage (weak signal);
    timeout in the establishment of a data session (e.g. access time higher than 6 seconds);
    error in the establishment of a data session;
    dropping of a voice call.

The rough measurement data of the third sub-set are preferably collected by the agent in a continuous manner during each measurement time window, or, as far as the asynchronous events are concerned, asynchronously with respect to the measurement time windows, at the occurrence of the relevant event. The measurement samples are preferably processed by the agent to provide derived measurement data to be sent to the server 13, which preferably comprise one or more of: the minimum value, the maximum value, the average value, the standard deviation, of the measurement samples within the measurement time window.

According to an advantageous embodiment of the present invention, the duration of the measurement time window may vary during operation of the agent according to the position of the user device. According to this embodiment, the agent is configured to collect rough measurement data of the first, second and third sub-sets cited above for a pre-determined period of time (e.g. an analysis period of four weeks) within fixed-duration measurement time windows. During the analysis period, the duration of each measurement time window may be set to e.g. 30 minutes. At the end of each measurement time window, the derived measurement data are sent by the user device to the server 13. The derived measurement data preferably comprise the geographic coordinates sensed by the user device in correspondence of each measurement time window (e.g. at the start or at the end of the measurement time window). At the end of the pre-determined analysis period, when the server 13 has collected all the derived measurement data sent by the user device, the server 13 preferably applies an algorithm suitable for clustering the derived measurement data according to the position of the user device. The algorithm is preferably configured to provide a number of locations indicating the most frequented positions of the user device during the pre-determined analysis period.

For instance, the applied algorithm may be the known "k-means" clustering algorithm. Application of this algorithm preferably provides an estimation of the one or more locations $L_n$, $n=1, \ldots, N$, (wherein N is an integer number higher than or equal to 1) in which the user device is most frequently located during its operation, which may comprise, for instance, house, workplace, second house. These locations will be indicated as "frequent locations". Each frequent location $L_n$ provided by the clustering algorithm is associated with an accuracy indicator $R_n$ indicating the accuracy of the estimation (which depends on the amount of measurement data used for the considered estimation) in terms of a radius. For instance, the clustering algorithm may determine that the most frequent location $L1$ of the user device is the user's house, with a radius $R1$ of a few tens of meters.

Data indicating the frequent locations $L_n$ provided by the clustering algorithm and their accuracy indicators $R_n$ are preferably stored in the database 14.

After expiration of the analysis period, data indicating the frequent locations $L_n$ provided by the clustering algorithm and their accuracy indicators $R_n$ are preferably sent by the server 13 to the agent residing in the user device. Preferably, the agent associates to each frequent location Ln of the user device a pre-defined duration of the measurement time window. For instance, according to advantageous embodiments, the agent may associate with the most frequent location of the user device L1 a long measurement time window, e.g. 30 minutes, and it may determine that locations Ln, n01, of the user device other than the most frequent location L1 (namely, whose distance from the most frequent location L1 is higher than the accuracy indicator R1 associated with the most frequent location) are associated with a short measurement time window, e.g. 5 minutes. Alternatively, the agent may associate a long measurement time window not only with the most frequent location L1 but also with a number of more frequent locations of the user device, and a short measurement time windows to the locations other than those number of more frequent locations.

During operation, the agent, based on the current position of the user device as inferred from the geographic coordinates sensed by the user device, preferably sets the duration of the current measurement time window to the value associated with the frequent location corresponding to the actual position of the user device or with the frequent location which, among the number of frequent locations Ln, is the nearest to the current position of the user device.

According to this advantageous embodiment, a longer measurement time window is used when the user's position corresponds to the more frequent locations of the user device and a shorter measurement time window is used in the other, less frequent, locations. In this way, a certain number of measurement data may be collected by the agent and sent to the server 13 when the user is in less frequent locations. Indeed, in case of measurement time windows of fixed duration, the number of measurement data collected by the server when the user is at home or at work would inevitably be much higher than the number of measurement data collected by the server 13 when the user is in any other less frequent location, such as in a transportation vehicle (train, bus, car). However, collecting measurement data also in less frequent locations would be of interest in evaluating critical conditions involving, for instance, cell re-selections or fading signal strength. Using measurement time windows with different, adaptive, durations advantageously allows collecting more measurement data in less frequent locations thus equalizing the number of measurement data collected by the server among all the locations of the user device.

The data indicating the frequent locations Ln and their accuracy indicators Rn may be periodically updated, for instance every week or month. In order to update these data, for instance on a week basis, the agent collects the rough measurement data of one or more measurement time windows in a pre-determined day of the week, and applies the clustering algorithm to the collected rough measurement data. This allows adapting the duration of the measurement time windows to the habits of the user, which may vary over time.

As already mentioned above, the rough measurement data of the first, second and third sub-sets collected by the agent during a measurement time window are preferably processed at the user device to provide the derived measurement data which are then sent to the server 13. Preferably, processing the rough measurement data at the user device comprises filtering the measurement samples to reduce noise and calculating the average value, the maximum value, the minimum value and the standard deviation of the measurement samples.

Advantageously, the processing steps performed at the user device on the rough measurement data collected by the agent allow reducing the amount of data sent to the server 13 and hence allow avoiding an excessive consumption of the user's traffic bundle. This advantageously leads to also reducing the battery consumption as sending the data is faster. Finally, the processing steps described above advantageously allow reducing the computational load at the server 13.

Preferably, the derived measurement data sent by the user devices 12a, 12b, 12c to the server 13 are stored in the database 14. Preferably, data sent by a given user device are associated with a unique user identifier identifying the user device. Moreover, for each user device, derived measurement data provided at the end of a given measurement time window are associated with an index uniquely identifying the given measurement time window within the sequence of measurement time windows set at the user device. Measurement time windows for a given user device may be identified by progressive indexes.

According to the method of the present invention, the derived measurement data collected by the server 13 further comprises the user's feedback and possibly the user's answers to a number of questions forming a questionnaire (also indicated as "instant poll") forwarded by the server 13 to the user device at the occurrence of an event, as described in greater detail herein after. The user's feedback preferably comprises an information indicating whether the user answered the questionnaire or not.

According to embodiments of the present invention, the agent residing on a user device preferably performs a polling procedure according to which the server 13 periodically (e.g. every five minutes) verifies whether the event triggering the sending of a questionnaire to the user device occurred.

Sending the questionnaire from the server 13 to the user device is preferably triggered by the occurrence of an event which is related to an instance (or occasion) of fruition of a service. An instance of service fruition may correspond to a data session during which the user operates the user device to run in foreground a software application. For example, in this case, an instance of service fruition may comprise a data session of a social networking application (e.g. Twitter), the data session comprising, e.g., opening the application, posting a tweet and closing the application. Moreover, an instance of service fruition may also comprise, for example, anyone of the following actions, which are not necessarily associated with running in foreground a given software application:

the user watches a video/audio content on her/his user device;
the user establishes a voice call/video call/VoIP call from her/his user device;
the user receives a voice call/video call/VoIP call on her/his user device.

Preferably, the event triggering the sending of the questionnaire is the end of the considered instance of service fruition. For example, with reference to the situations mentioned above, forwarding of the questionnaire may be triggered when the user closes the application, as well as when the user ends watching the video content, or listening the audio content, or when the call ends.

Preferably, the event triggering the sending of the questionnaire is detected by the server 13 by processing the derived measurement data collected during the measurement time windows spanning the duration of the considered instance of service fruition and in particular the measurement time window during which the event occurred, as it will be described in greater detail herein after.

Detecting the event described above (e.g. end of a video/audio content, end of a call) may be performed by comparing one or more derived measurement data associated with the measurement time sessions spanning the considered instance of service fruition with corresponding pre-determined thresholds. As described above, according to the present invention, each software application residing on the user device may be monitored by the agent, by collecting rough measurement data during the measurement time windows over which the application is operating. In particular, the user device measures samples of the throughput associated with a given application. At the end of each measurement time windows, the agent preferably computes the derived measurement data associated with the collected samples (e.g. average value, minimum value, maximum value, standard deviation of the throughout) and sends them to the server 13. In this case, detecting the event described above may be performed by the server 13 by comparing the derived measurement data with corresponding thresholds (e.g. by comparing the average throughput with a corresponding threshold) and checking whether the considered value goes below said threshold: in this case, closure of the related application is detected.

It may be noticed that, according to the embodiments described above, the thresholds may be advantageously configured by the administrator in the server 13 and they may be dynamically adjusted according to, for instance, specific network conditions. This ensures a great flexibility and improves the reliability of the operation of detecting the event triggering the sending of the questionnaire.

The end of a video or audio content may be detected as described above by considering the software application used to enjoy the video/audio content. Besides the throughput, also the volume may be considered to check whether the content ended, as well as the duration of time interval during which the application ran in foreground on the user device. For example, in case the user is listening to an audio content (e.g. a song) by running a given application, the server 13 may check the derived measurement data related to the volume associated with the given application and check whether and when, e.g., the average volume goes below a pre-determined threshold. In the affirmative, closure of the application may be detected. In addition, the server 13 may check whether the user ran the given application in foreground for a time interval longer than a pre-determined threshold duration (e.g. 3 minutes): in the affirmative, not only the closure of the application, but also the end of the audio content may be detected.

Figure 2:
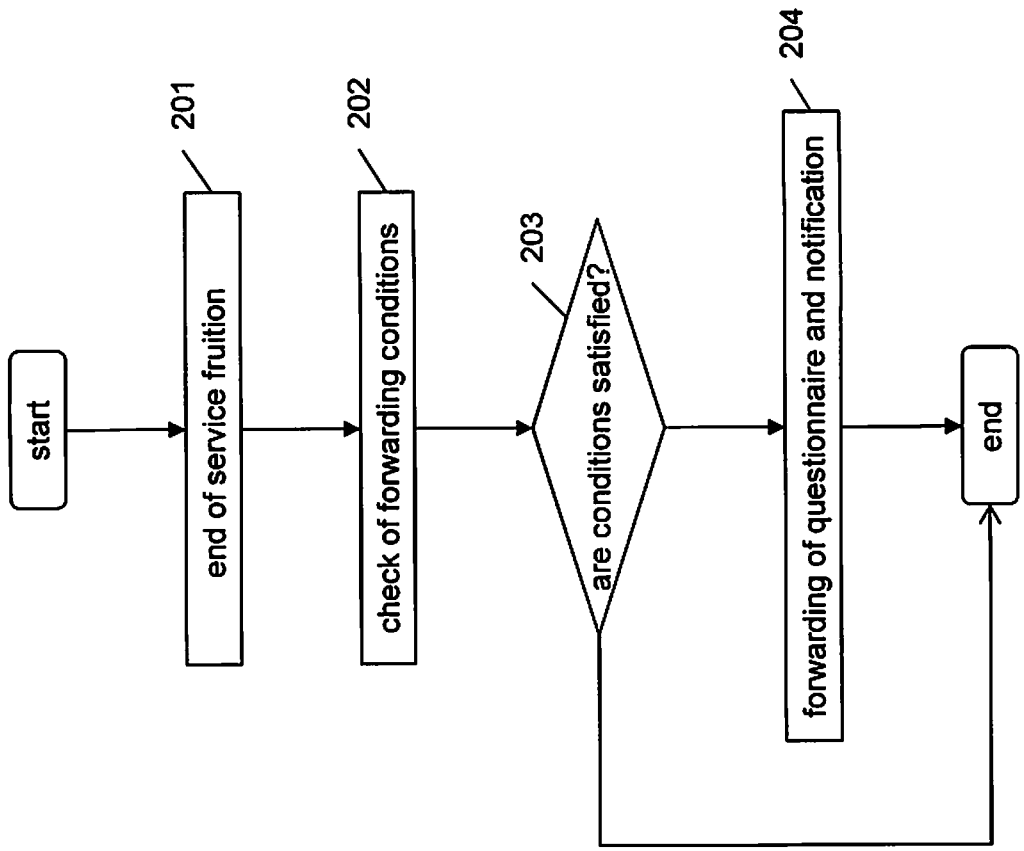
FIG. 2 is a flowchart illustrating steps of the method according to the present invention.

Moreover, according to advantageous embodiments of the present invention, sending the questionnaire to the user device is performed under pre-determined forwarding conditions. This is illustrated in the flowchart of FIG. 2. According to embodiments of the present invention, the method comprises, at the end of the considered instance of service fruition (step 201), checking the set of forwarding conditions. The forwarding conditions may comprise conditions to be checked based on the derived measurement data collected by the server 13 at the end of the measurement time windows spanning the duration of the considered instance of service fruition, in particular at the end of the measurement time window comprising the event triggering the forwarding of the questionnaire. As disclosed above, for the considered user device, the derived measurement data are stored in the database 14. For example, the forwarding conditions may relate to one or more of the following parameters:

the strength of the signal received by the user device within the communications network during the measurement time window;

the radio access technologies available to the user device;

the number of cell reselections during the measurement time window;

the location of the user device (at home, at work, or the like);

the speed of movement of the user device (indicating whether the user is moving on foot, on a car, on a train, or the like);

the time of the day.

For instance, the method according to embodiments of the present invention may provide that forwarding the questionnaire is performed when one or more of the following conditions are satisfied:

the signal strength is lower than a given threshold;

the user device is not using a Wi-Fi connection;

the user device experiences a number of cell reselections higher than a given threshold, which may mean that the user device is moving (e.g. the user is on a train);

the average throughput of a certain software application is lower than a given expected threshold;

a call has been just terminated;

it is a given time of the day;

the user has been in a predefined location (e.g. in a mall or at home).

In at least some of the situations mentioned above, the feedback by the user may give useful information to the network operator in a critical situation of connectivity.

As mentioned above, the forwarding conditions may also comprise conditions related to the position of the user device and/or to the time of the day. According to these conditions, for a given type of service (e.g. the video streaming service), forwarding the questionnaire may depend on the user location or on the time of the day at the end of the service fruition. An exemplary forwarding condition provides for checking whether the user is at home and, consequently, for forwarding the questionnaire only if the user is actually at home. Another exemplary forwarding condition provides for checking whether the event triggering the forwarding of the questionnaire (e.g. the end of the video streaming) occurs in a given time slot, e.g. from 6 pm to 9 pm during the day. The user location and the time of the day may be inferred from the derived measurement data stored in the database 14.

Further, the forwarding conditions may comprise conditions related to the user behaviour. According to the present invention, a user behaviour may be inferred from the derived measurement data stored in the database 14, and in particular from the user's answers to questionnaires. For instance, for a user watching a plurality of video contents during the day using her/his smartphone at home, the method may provide that forwarding the questionnaire is performed at the end of the first video content and that the questionnaire is not presented again to the user after the end of the other video contents. This advantageously allows avoiding bothering the user with a plurality of questionnaires related to the fruition of a same service in nearly the same connectivity conditions. According to another example, the method may provide that forwarding the questionnaire for a given type of service (e.g. video streaming) is not performed in case the user has proven to be reluctant to answer. In particular, the method may provide not to forward the questionnaire after the user watches a streaming video content if the user has not answered to similar questionnaires in relation to preceding instances of the same video streaming service fruition.

According to another example, the method may provide that forwarding the questionnaire for a given type of service (e.g. video streaming) or for a specific software application is conditionally performed based on a random variable. In this case, forwarding the questionnaire occurs randomly at the end of the considered instance of service fruition. For example, if the user uses a given software application for listening to music for a number of times during the day, the questionnaire is forwarded to the user only after a single instance or few instances, which are selected randomly. This advantageously allows reducing the number of questionnaires possibly sent to a user in case she/he uses the same software application frequently during the day.

It will be appreciated by the person skilled in the art that implementation of the conditional forwarding of the questionnaire allows optimizing the network resource usage by minimizing the exchange of data (questions and answers) between the user device and the server and minimizing the data to be stored in the database. Moreover, it allows improving the reliability and usefulness of the user's answers since questionnaires may be advantageously sent to the user devices only in specific situations, for instance only when the network conditions are critical.

The questions comprised in the questionnaire for a given instance of fruition of a service are preferably selected among a set of questions that are pre-determined by an expert as being relevant for the considered service. The questions may be determined as being part of survey campaigns promoted by entities such as the service providers or the network operators that are interested in the users' feedback.

The service/platform administrator in charge of managing the server 13 may load the questions on the server 13 and determine questionnaires based on decision trees, with possibly conditional branches. The trees may be customized according to the specific service, the specific applications, the conditions of fruitions, the user's context, etc. Each questionnaire comprises a reasoned sequence of questions, with possibly conditional branches, that may be decided by the expert, wherein each question may depend on the user's answer to the preceding question. At the server 13, each questionnaire is preferably associated with relevant forwarding conditions.

At step 202 of the flow chart of FIG. 2, preferably, the server 13 checks the forwarding conditions. If the conditions are all satisfied (step 203), the questionnaire is preferably sent from the server 13 to the user device (step 204). The agent preferably processes the questionnaire in order to present the questions to the user through the GUI. Moreover, a notification (e.g. a push notification accompanied by a sound and/or a vibration of the user device) is sent to the user device (step 204) indicating to the user the availability of a questionnaire related to the service that the user has enjoyed. If the user agrees to answer the questionnaire (by, e.g. clicking on the notification), a confirmation question may be presented to the user through the GUI, asking the user if she/he wants to proceed answering the questionnaire. If the user does not agree to answer the questionnaire the first time she/he is presented with the notification, the notification is preferably periodically presented to the user for a pre-determined number of times at fixed time intervals. According to embodiments of the present invention, if the user agrees answering the questionnaire upon the first or upon any of the subsequent notification, the user may answer the questionnaire straightaway or at a later time, by using the GUI of the agent. The user has also the possibility of not answering the questionnaire. Indeed, if the user does not agree to answer the questionnaire upon presentation of the first or any subsequent notification (or by answering "NO" to the confirmation question), notifications are no more sent to the user device.

A user feedback may be in any case collected by the agent indicating whether the user agrees to answer the questionnaire or not, and a corresponding information is sent to the server 13. If the user agrees to answer the questionnaire, the user answers are preferably collected by the agent and then sent from the user device to the server 13. The server 13 preferably stores the feedback information, indicating whether the user answered the questionnaire, and possibly the user's answers in the database 14.

The server 13 may process the user's feedback, and in particular the user's answers, and analyse their relationship with the derived measurement data that have been collected by the agent during the measurement time windows spanning over the service fruition period. This allows evaluating the QoE of the service the user has enjoyed in dependence on a number of factors, which indicate the user behaviour and the conditions of the network resources during the fruition of the service. This may also lead to possibly adapting the usage of network resources to maximize the QoE.

In the following description, a number of use cases will be disclosed illustrating the application of the method according to the present invention. In all cases it is assumed that the measurement time windows have duration equal to 20 minutes.

Use Case 1

In the first use case, user A is watching a video content on her/his smartphone by using a software application such as YouTube®, TIMVision®, Netflix® or RaiPlay®. It is assumed that the time the user A starts watching the video content corresponds to the 5th minute of a measurement time window. User A watches the video content for 30 minutes. In the meantime, the agent residing on the user device collects a number of rough measurement data. In particular, the agent collects rough measurement data related to the fruition of the video streaming service during the measurement time windows over which the fruition of the service is spanned, namely the measurement time window comprising the time instant at which user A starts watching the video content (first measurement time window) and the subsequent measurement time window (second measurement time window).

At the end of the first measurement time window, user A is still watching the video content. The derived measurement data provided by the agent at the end of the first measurement time window are sent to the server 13 by the user device. In particular, the user device sends to the server 13 derived measurement data related to the throughput, the volume and the activity time of the software application used to watch the video content, in downstream and upstream, in foreground and background. From the received derived measurement data, the server 13 determines that at the end of the first measurement window use A is still watching the video content and does not send any questionnaire to the user device.

The second measurement window ends 5 minutes after user A ended watching the video content. The derived measurement data provided by the agent at the end of the second measurement time window are sent to the server 13 by the user device. In particular, the user device sends to the server 13 measurement data related to the throughput, the volume and the activity time of the software application used to watch the video content, in downstream and upstream, in foreground and background. From the received derived measurement data, the server 13 determines that, at the end of the second measurement window, user A is no more watching the video content.

At the end of the second measurement time window, the server 13 checks the forwarding conditions. In particular, in this example, the server 13 checks whether the signal strength is lower than a given threshold (e.g. −100 dBm) and whether the location of the user device is not the user's house or the user's workplace. If both the forwarding conditions are satisfied, the server 13 sends to the user device a questionnaire related to the service fruition and a notification informing user A of the availability of the questionnaire, which may be a push notification (associated with vibration and sound) that may be displayed as a banner on top of the screen of the user device or as a pop-up window opening on the screen of the user device.

User A may agree to answer the questionnaire by opening the push notification (by, e.g., clicking on the banner or on the pop-up window). If user A does not answer the questionnaire after 5 minutes from receiving the notification, another push notification is sent by the server 13 to the user device. If user A does not answer the questionnaire after 30 minutes from receiving the first notification, the server 13 stops sending push notifications to the user device.

If user A decides answering the questionnaire within 30 minutes, she/he A is presented with a set of dialog boxes opening sequentially via the GUI of the agent, each dialog box comprising one or more questions and a set of possible answers. According to this use case, the questions presented sequentially to the user may be the following (possible answers are illustrated in square brackets):

1. Do you want to answer a questionnaire about the video you just watched? [yes/no]
2. If yes, was the video in high definition? [yes/no/don't know/don't remember]
3. Did the video comprise any advertisement? [yes/no/don't know/don't remember]
4. Indicate the time the video took to open [less than 2 seconds/3-4 seconds/5-10 seconds/more than 10 seconds]
5. Where were you while watching the video? [closed place/outdoor/on a moving vehicle]
6. Have you experienced any one of the following problems? [slow opening of the video/temporary outages/compression artifacts/jerky image/audio and video out of sync/video stoppage/app stoppage/other/none]
7. Score the video opening speed [from 1 to 10]
8. Score the quality of the video images [from 1 to 10]
9. Score the quality of the audio [from 1 to 10]
10. Evaluate your overall use experience [from 1 to 10]
11. Indicate the applications that you are using at least once per week to watch videos [Google Play/Infinity/Mediaset on Demand/Netflix/Premium Play/RaiPlay/SkyGo/TIMVision/YouTube/other]
12. Based on your experience with this service, would you recommend your mobile network operator to a friend? [yes/no/don't know]

After the user provides her/his answer on the last question, the agent sends to the server 13 all the answers of the user.

If the user, during the same day, watches another video content by using the same software application, the server 13 is not sending any other questionnaire to the user device.

At the server 13, the answers of user A may be analysed together with the corresponding answers of a group of other users involved in the same measurement campaign. A correlation may be investigated between one or more network performance parameters (such as the downstream average throughput of the considered software application) and the scores given by the users.

Use Case 2

Network Operator A provides connectivity to user B within the communications network. User B enters a commercial mall. It is assumed that the instant of time at which user B enters the mall corresponds to the 7th minute of a measurement time window. At 9th minute of the same measurement time window, user B receives a voice call on her/his user device, and the call has a duration of 5 minutes. At the end of the measurement time window, the agent sends to the server 13 the derived measurement data related to the signal strength and the number of cell reselections. From the received derived measurement data, the server 13 determines that user B has received and terminated a voice call.

At the end of the measurement time window, the server 13 sends to the user device a questionnaire related to the service fruition and a notification informing user B of the availability of the questionnaire, which may be a push notification (associated with vibration and sound) that may be displayed as a banner on top of the screen of the user device or as a pop-up window opening on the screen of the user device.

User B may agree to answer the questionnaire by opening the push notification (by, e.g., clicking on the banner or on the pop-up window). If user B does not answer the questionnaire after 5 minutes from receiving the notification, another push notification is sent by the server 13 to the user device. If user B does not answer the questionnaire after 30 minutes from receiving the first notification, the server 13 stops sending push notifications to the user device.

If user B decides answering the questionnaire within 30 minutes after the first notification, she/he is presented with a set of dialog boxes opening sequentially via the GUI of the agent, each dialog box comprising one or more questions and a set of possible answers. According to this use case, the questions presented sequentially to the user may be the following (possible answers are illustrated in square brackets):

1. During the call, did you experience any audio hole? [yes/no]
2. How was the quality of the voice? [bad/poor/sufficient/good/very good]
3. How was the quality of the call in this place as compared to the quality that you typically experience? [better/same/worse]
4. Based on your experience with this voice call, would you recommend network operator A to a friend? [yes/no/don't know]

After the user provides her/his answer on the last question, the agent sends to the server 13 all the answers of the user.

In the meanwhile, user C enters the mall. User C has a different network operator, network operator D. It is assumed that the instant of time at which user C enters the mall corresponds to the 15th minute of a measurement time window. At the 17th minute of the same measurement time window, user C receives a voice call on her/his user device, and the call has a duration of 10 minutes, which hence spans over two measurement time windows. At the end of each measurement time window, the agent sends to the server 13 the derived measurement data related to the signal strength and the number of cell reselections. From the received derived measurement data, the server 13 determines that user C has received and terminated a voice call.

At the end of the second measurement time window, the server 13 sends to the user device the questionnaire already sent to user B with the questions listed above and informs user C of the availability of a questionnaire related to the service fruition.

At the server 13, the answers of users B and C may be analysed together with the corresponding answers of other users who were in the same commercial mall. In this way, the quality of the voice calls established over the communications network of different mobile network operators may be compared.

Use Case 3

The user device of user A is connected to the communications network of network operator B. At $2^{nd}$ minute of a measurement time window, user A receives a VoIP call on her/his user device by means of an instant messaging software application MSG_APP (e-g-WhatsApp). Five minutes after having received the call, user A enters her/his house and the user device automatically connects to a Wi-Fi network. Two minutes after having entered the house, the call ends. At the end of the measurement time window, the agent sends to the server 13 the derived measurement data. From the received derived measurement data, the server 13 determines that user A has received and terminated a VoIP call and that the call has been established both over the communications network of network operator B and over the Wi-Fi network at the user's house.

At the end of the measurement time window, the server 13 sends to the user device a questionnaire related to the service fruition and a notification informing user A of the availability of the questionnaire, which may be a push notification (associated with vibration and sound) that may be displayed as a banner on top of the screen of the user device or as a pop-up window opening on the screen of the user device.

User A may agree to answer the questionnaire by opening the push notification (by, e.g., clicking on the banner or on the pop-up window). If user A does not answer the questionnaire after 5 minutes from receiving the notification, another push notification is sent by the server 13 to the user device. If user A does not answer the questionnaire after 30 minutes from receiving the first notification, the server 13 stops sending push notifications to the user device.

If user A decides answering the questionnaire within 30 minutes after the first notification, she/he is presented with a set of dialog boxes opening sequentially via the GUI of the agent, each dialog box comprising one or more questions and a set of possible answers. According to this use case, the questions presented sequentially to the user may be the following (possible answers are illustrated in square brackets):

1. How often have you made MSG_APP calls in the last month? [every day/twice a week/twice a month/never]
2. How often have you received MSG_APP calls in the last month? [every day/twice a week/twice a month/never]
3. How useful do you consider this service? [a lot/enough/sufficient/little/none]
4. How was the overall quality of the call? [bad/poor/sufficient/good/very good]
5. When connection switched to Wi-Fi did you notice any difference in the quality of the call? [yes/no]
6. If yes, which kind of difference?
7. How do you judge the quality of the call over the communications network as compared to the quality of the call over Wi-Fi? [better/same/worse]
8. How do you judge the quality of the MSG_APP call as compared to a traditional voice call? [better/same/worse]
9. Based on your experience with this call, would you recommend using MSG_APP for a voice call to a friend? [yes/no/don't know]

After the user answers the last question, the agent sends to the server 13 all the answers of the user.

At the server 13, the answers of user A may be analysed together with the corresponding answers of other users who:
- made or received VoIP calls with the same software application MSG_APP but over networks of different mobile network operators;
- made or received VoIP calls with the same software application MSG_APP moving from a mobile connectivity (as provided over the communications network of operator B) to a Wi-Fi connectivity;
- made or received VoIP calls with the same software application MSG_APP using the Wi-Fi connectivity of different operators.

In this way, the server 13 may evaluate the QoE of the service depending on the network operator or the type of connectivity.

Use Case 4

User A is travelling on a train and listening to music by means of an audio streaming software application MUSIC_APP (e.g. TIMmusic). The user device is connected to the communications network of network operator B. It is assumed that user A starts listening to music at the 15th minute of a measurement time window.

At the end of the measurement time window, user A is still listening to music. The derived measurement data provided by the agent at the end of the measurement time window are sent to the server 13 by the user device. In particular, the user device sends to the server 13 derived measurement data related to the throughput, the volume and the activity time of the software application used to listen to music, in downstream and upstream. From the received derived measurement data, the server 13 determines that at the end of the measurement window user A is still listening to music and does not send any questionnaire to the user device.

User A listens to music for a time period of 20 minutes while she/he is travelling on the train. Fruition of the service by user A hence spans over two measurement windows.

At the end of each measurement time window, the agent sends to the server 13 the derived measurement data. From the received derived measurement data, the server 13 determines that user A, at the end of the second measurement time window, has terminated listening to music. Moreover, from the received derived measurement data, the server 13 determines that while user A was listening to music, the train exceeded a pre-defined speed (e.g. 100 Km/h).

At the end of the second measurement time window, the server 13 sends to the user device a questionnaire related to the service fruition and a notification informing user A of questionnaire, which may be a push notification (associated with vibration and sound) that may be displayed as a banner on top of the screen of the user device or as a pop-up window opening on the screen of the user device.

User A may agree to answer the questionnaire by opening the push notification (by, e.g., clicking on the banner or on the pop-up window). If user A does not answer the questionnaire after 5 minutes from receiving the notification, another push notification is sent by the server 13 to the user device. If user A does not answer the questionnaire after 30 minutes from receiving the first notification, the server 13 stops sending push notifications to the user device.

If user A decides answering the questionnaire within 30 minutes after the first notification, she/he is presented with a set of dialog boxes opening sequentially via the GUI of the agent, each dialog box comprising one or more questions and a set of possible answers. According to this use case, the questions presented sequentially to the user may be the following (possible answers are illustrated in square brackets):
1. Have you got any subscription to MUSIC_APP? [yes/no]
2. Do you know that MUSIC_APP does not consume your traffic bundle if used under the communications network of operator B? [yes/no]
3. Did you encounter any problem in using MUSIC_APP? [yes/no]
4. If yes, which kind of problem?
5. Did you experience any problem when the train exceeded the speed of 100 Km/h? [yes/no]
6. If yes, which kind of problem?
7. Score the following aspects: audio quality, starting time of the tracks, loading speed of the playlists [from 1 to 10]
8. How do you judge your experience with the MUSIC_APP? [from 1 to 10]
9. If you typically use other software applications to listen to music, indicate the application(s) mostly used.
10. In case you indicated at least one other software application, how do you judge the quality of MUSIC_APP as compared to the other software application(s)? [better/same/worse]
11. Based on your experience, would you recommend network operator B to a friend? [yes/no/don't know]

After the user answers the last question, the agent sends to the server 13 all the answers of the user.

At the server 13, the answers of user A may be analysed together with the corresponding answers of other users who:
used the same software application MUSIC_APP over the same communications network;
used the same software application MUSIC_APP over the same communications network while being on a moving vehicle;
used similar software applications over different communications networks.

In this way, the server 13 may evaluate the QoE of the service depending on different factors such as the speed of the vehicle over which the user is located, and it may evaluate the QoE of a same service as provided by possibly different software applications over different communications networks.

Use Case 5

Users A and B use different software applications during the day: for the video streaming (e.g. YouTube), for the music streaming (e.g. Spotify), for web browsing (e.g. Google Chrome) and for instant messaging (e.g. Skype). User A is using a smartphone, while user B is using a tablet. Both user devices are connected to the same communications network.

At the end of a measurement time window, the server 13 sends to the user devices of both users A and B a questionnaire related to the services fruition and a notification informing users of the availability of the questionnaire related to the services fruition, which may be a push notification (associated with vibration and sound) that may be displayed as a banner on top of the screen of each user device or as a pop-up window opening on the screen of each user device.

Users A and B may agree to answer the questionnaire by opening the push notification (by, e.g., clicking on the banner or on the pop-up window). If users do not answer the questionnaire after 5 minutes from receiving the notification, another push notification is sent by the server 13 to the user devices. If users do not answer the questionnaire after the second notification, the server 13 continues sending notification up to a fixed number (e.g. 3). Notifications are sent at a given distance in time one from the other (e.g. 1 hour).

If users A and B decide answering the questionnaire after a notification, they are presented with a set of dialog boxes opening sequentially via the GUI of the agent, each dialog box comprising one or more questions and a set of possible answers. The same questions are presented sequentially for a number of times equal to the number of software applications that have been used by users A and B during the day for a period of time longer than M minutes, M being an integer number higher than or equal to 1 (e.g. M=10). According to this use case, the questions relative to any one of the software applications (the generic application will be indicated as APP) may be the following (possible answers are illustrated in square brackets):
1. How do you judge the quality of application APP that you used today? [from 1 to 10]
2. Have you encountered any problem in using the application APP today? [yes/no]
3. If yes, which kind of problem?
4. Where have you used the application APP today? [closed place/outdoor/on a vehicle]
5. If in a closed place, in which kind of closed place? [workplace/house/shop or mall/gym/school/theatre or cinema/other]
6. If outdoor, in which kind of outdoor environment? [large city/small city/countryside/on a mountain or hill/sea/other]
7. If on a vehicle, which kind of vehicle? [car/motorcycle/train/bicycle/bus or subway/ship/other]
8. If you used the application APP in two different environments, have you noticed any difference in the quality of the application? [yes, better in closed place/yes, better outdoor/yes, better on the vehicle/no/don't know]
9. Based on your experience, would you recommend application APP to a friend? [yes/no/don't know]

After each user answers the last question, the respective agent sends to the server 13 all the answers of the user.

At the server 13, the answers of users A and B may be analysed together with the corresponding answers of other users who:
used the same software application APP over the same communications network;
used the same software application APP in different environments;
used the same software application APP over different communications networks;
used different software applications in different environments;
used different software applications on different user devices.

In this way, the server 13 may evaluate the QoE of a service depending on different factors. Indeed, it may compare the QoE of the service as provided by a given software application APP in different environments or by different network operators. Moreover, the server 13 may determine which software applications are used the most in each different environment (closed place/outdoor/on a vehicle) and, within each environment, which software applications are used mostly in a specific location (workplace, house, gym, small city, car, etc.). Further, the server 13 may determine which software applications are used mostly on a given user device (smartphone or tablet) and which user device is mostly used in a specific environment.

The invention claimed is:

1. A method for collecting data for evaluating a quality of experience of a service provided to a user over a communications network, the method comprising:
   a) providing an agent configured to run on a user device of said user, the user device being capable of connecting to said communications network;
   b) determining a number of frequent locations indicating the most frequented locations of said user device and associating, with said frequent locations, pre-determined measurement time windows having a longer duration than pre-determined measurement time windows associated with other locations of said user device;
   c) collecting, by said agent and during said pre-determined measurement time windows, rough measurement data indicative of parameters related to an operation of said user device during an instance of fruition of said service by said user;
   d) providing, by said agent, derived measurement data derived from said rough measurement data and sending said derived measurement data to a server through said communications network;
   e) at said server, determining an ending of said instance of fruition of said service and checking, based on said derived measurement data, one or more forwarding conditions indicating at least one condition to be satisfied in order for the server to send a questionnaire to said user device, said questionnaire comprising questions related to said instance of service fruition;
   f) after said ending of said instance of service fruition, in case said one or more forwarding conditions are satisfied, sending said questionnaire from said server to said user device; and
   g) collecting, by said agent, feedback from said user.

2. The method according to claim 1, wherein said rough measurement data comprise a first subset of data indicative of static parameters identifying the user device comprising one or more of: a device hardware model; a device firmware model; screen resolution; an operating system release; and an agent release.

3. The method according to claim 1, wherein said rough measurement data comprise a second subset of data indicative of one or more of the following parameters associated with an operation of said user device: a received signal strength indicator; a reference signal received power; a reference signal received quality; a date and time of day; geographic coordinates; a local area code; a cell ID; a mobile network operator; a radio access technology; an access point name; and an IP address.

4. The method according to claim 1, wherein said rough measurement data comprise samples of a third subset of data indicative of one or more of the following parameters associated with a software application installed on said user device: throughput, in downstream and upstream and in foreground and background; and volume, in downstream and upstream and in foreground and background.

5. The method according to claim 4, wherein said step d) is performed at the end of one of said pre-determined measurement time windows and said derived measurement data comprise one or more of an average value, a minimum value, a maximum value, and a standard deviation of said samples collected during the one of said pre-determined measurement time windows.

6. The method according to claim 1, wherein at said step e) said determining an ending of said instance of fruition of said service comprises detecting a corresponding event, said detecting comprising comparing one or more derived measurement data collected by said server during the pre-determined measurement time windows spanning a duration of said instance of service fruition with corresponding thresholds.

7. The method according to claim 6, wherein said forwarding conditions are checked based on the derived measurement data collected by said server at the end of one of the pre-determined measurement time windows comprising said event.

8. The method according to claim 6, wherein the forwarding conditions relate to one or more of the following parameters: a strength of a signal received by said user device within said communications network; a radio access technology available to said user device; a number of cell reselections experienced by said user device within said communications network; a location of the user device; a speed of movement of the user device; and a time of day.

9. The method according to claim 8, wherein said forwarding conditions comprise one or more of the following conditions:
   said signal strength is lower than a first threshold;
   said user device is not using a Wi-Fi connection;
   said user device experiences a number of cell reselections higher than a second threshold;
   an average throughput of a certain software application is lower than a third threshold;
   a call has been just terminated at said user device;
   it is a given time of day; and
   said user has been in a certain location.

10. The method according to claim 6, wherein said forwarding conditions comprise conditions related to a user behaviour.

11. The method according to claim 6, wherein said forwarding conditions comprise conditions according to which said questionnaire is sent to said user device based on a random variable.

12. A communication system comprising a wireless communication network, a user device of a user of said wireless communications network and a server, wherein a service provider provides a service to said user through said communications wireless network, and wherein said user device comprises an agent, the user device being capable of connecting to said wireless communications network, wherein said agent is configured to:
   determine a number of frequent locations indicating the most frequented locations of said user device and associating, with said frequent locations, pre-determined measurement time windows having a longer duration than pre-determined measurement time windows associated with other locations of said user device;
   collect, during said pre-determined measurement time windows, rough measurement data indicative of parameters related to an operation of said user device during an instance of fruition of said service by said user; and
   provide derived measurement data derived from said rough measurement data and send said derived measurement data to said server through said wireless communications network,
   wherein said server is configured to:
   determine an ending of said instance of fruition of said service and check, based on said derived measurement data, one or more forwarding conditions indicating at least one condition to be satisfied in order to send a questionnaire to said user device, said questionnaire comprising questions related to said instance of service fruition; and after said ending of said instance of service fruition, in case said one or more forwarding conditions are satisfied, send said questionnaire to said user device, and wherein said agent is further configured to collect a feedback from said user.

\* \* \* \* \*